United States Patent
Baranowski et al.

(10) Patent No.: US 11,872,748 B2
(45) Date of Patent: Jan. 16, 2024

(54) METHOD FOR THE ADDITIVE MANUFACTURING OF A COMPOSITE COMPONENT, AND COMPOSITE COMPONENT

(71) Applicant: Ford Global Technologies, LLC, Dearborn, MI (US)

(72) Inventors: Thomas Baranowski, Würselen (DE); Maik Broda, Würselen (DE); Markus Franzen, Stolberg (DE); Pascal Rebmann, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/317,564

(22) Filed: May 11, 2021

(65) Prior Publication Data

US 2021/0354377 A1    Nov. 18, 2021

(30) Foreign Application Priority Data

May 13, 2020   (DE) .......................... 102020206051.7

(51) Int. Cl.
| | |
|---|---|
| *B29C 64/165* | (2017.01) |
| *B29C 70/38* | (2006.01) |
| *B33Y 10/00* | (2015.01) |
| *B33Y 30/00* | (2015.01) |
| *B33Y 80/00* | (2015.01) |

(52) U.S. Cl.
CPC .......... *B29C 64/165* (2017.08); *B29C 70/386* (2013.01); *B33Y 10/00* (2014.12); *B33Y 30/00* (2014.12); *B33Y 80/00* (2014.12)

(58) Field of Classification Search
CPC ..... B29C 64/165; B29C 70/386; B33Y 10/00; B33Y 30/00; B33Y 80/00
See application file for complete search history.

(56) References Cited

U.S. PATENT DOCUMENTS

| | | | |
|---|---|---|---|
| 8,827,684 B1 | 9/2014 | Schumacher et al. | |
| 2011/0203737 A1 | 8/2011 | Slyne | |
| 2015/0108677 A1* | 4/2015 | Mark ..................... | B29C 70/20 425/375 |

FOREIGN PATENT DOCUMENTS

| | | |
|---|---|---|
| DE | 202015103801 | 9/2015 |
| WO | 2015118068 | 8/2015 |

\* cited by examiner

*Primary Examiner* — Joseph S Del Sole
*Assistant Examiner* — John Robitaille
(74) *Attorney, Agent, or Firm* — Burris Law, PLLC

(57) ABSTRACT

A method for the additive manufacturing of a composite component in which a fluid matrix material by way of an additive manufacture is introduced successively into a manufacturing device with the formation of an additively manufactured component. A reinforcing element is at least partly introduced into the fluid matrix material and/or arranged on the fluid matrix material.

16 Claims, 2 Drawing Sheets

(Fig. 1)
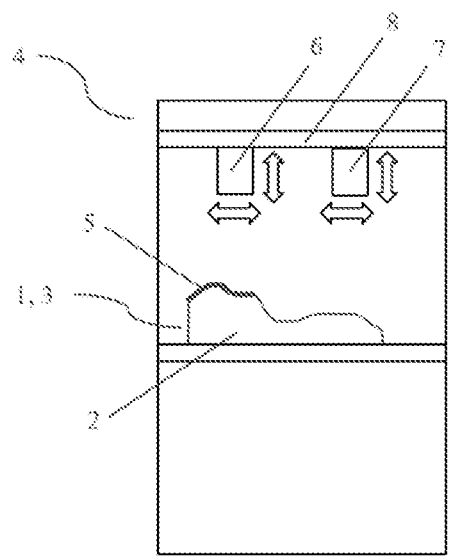
(Fig. 2)
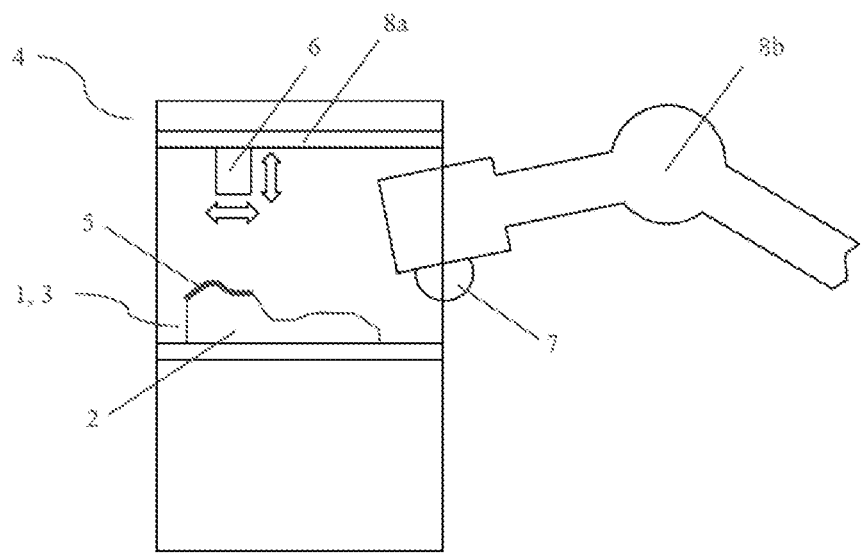

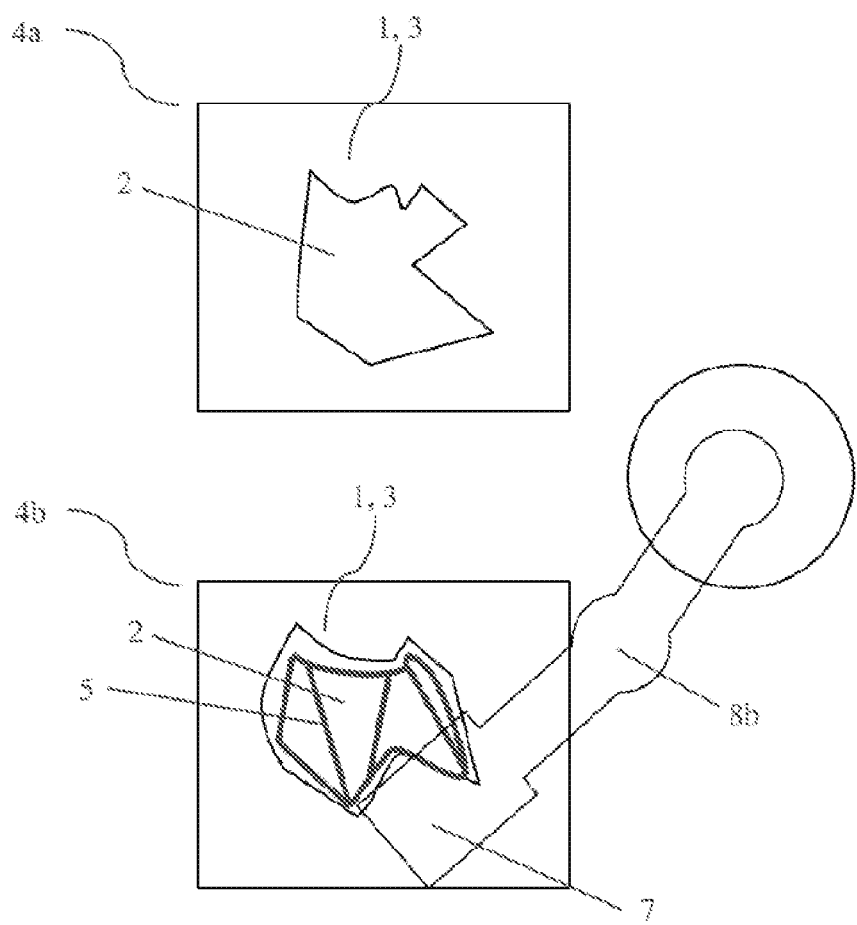
(Fig. 3)

METHOD FOR THE ADDITIVE MANUFACTURING OF A COMPOSITE COMPONENT, AND COMPOSITE COMPONENT

CROSS-REFERENCE TO RELATED APPLICATION

This application claims priority to and the benefit of German Patent Application No. 102020206051.7, filed on May 13, 2020. The disclosure of the above application is incorporated herein by reference.

FIELD

The present disclosure relates to a method for producing a composite component by means of additive manufacturing, and to a composite component produced by the method.

BACKGROUND

The statements in this section merely provide background information related to the present disclosure and may not constitute prior art.

"Additive manufacturing" is understood to mean manufacturing methods in which fluid materials are successively introduced into a manufacturing device or applied to a carrier layer by layer, in order thus to create three-dimensional workpieces. In the process, the layer-by-layer manufacture is performed in a computer-controlled manner from one or more fluid materials in accordance with predefined dimensions and shapes (e.g., CAD data). During layer-by-layer application, physical or chemical hardening or melting processes take place. Typical fluid materials which are used in the additive manufacture are plastics, synthetic resins, ceramics and metals. Carbon or graphite materials may also be suitable for additive manufacturing. "Additive manufacture" can also synonymously be understood as 3D printing.

U.S. Pat. No. 8,827,684 B1 discloses 3D printers with a plurality of printheads operated simultaneously to minimize the printing time. The printheads comprise a plurality of stepper motors for conveying a filament and heating elements for melting the filament. The molten filament is then printed by a nozzle with a defined diameter and deposited onto a print bed. As soon as the first layer has solidified, a further layer is applied. The component is thus built up layer by layer. In this respect, various thermoplastic materials or other fluid materials, such as metals, can be processed.

German Patent Application No. DE20201510380.1 U1 discloses 3D printers comprising a plurality of processing heads, which serve to produce 3D printed components with integrated electrical functional elements. A semifinished component is produced from a first processing head, into which the electrical functional elements are inserted from a second processing head. Further material is then applied from the first processing head to embed the electronic components. The component is thus built up layer by layer.

3D printed components are frequently not able to bear high mechanical loads. This applies primarily to components of plastic, the starting materials of which, such as for example PLA (Polylactic Acid) or PET (Polyethylene Terephthalate), do not have high mechanical strengths. In order to be able to compete with the mechanical properties of modern materials, such as for example fiber-reinforced plastics, increased stability of 3D printed components is desired.

SUMMARY

This section provides a general summary of the disclosure and is not a comprehensive disclosure of its full scope or all of its features.

The present disclosure comprises a method for producing a composite component which has improved mechanical properties and a composite component manufactured by the method of the present disclosure.

It should be noted that the features specified individually in the claims may be combined with one another in any desired technically meaningful manner (even beyond category limits, for example between the method and the device) and disclose further configurations of the present disclosure. The description additionally characterizes and specifies the disclosure, in particular in conjunction with the figures.

It should also be noted that a conjunction "and/or" which is used herein and is situated between two features so as to link them should always be interpreted to mean that it is possible in a first configuration of the subject matter according to the disclosure for only the first feature to be present, in a second configuration for only the second feature to be present, and in a third configuration for both the first and the second feature to be present.

It is desired for the present disclosure that one or more reinforcing elements is/are introduced into a matrix material of an additively manufactured component (what is meant is in particular a component produced in the course of a 3D printing method) during additive manufacture. If a reinforcing element has a high mechanical stability, such a reinforcing element can positively influence and improve the mechanical properties of the additively manufactured component. It may also be provided that the stability-improving properties of the reinforcing element have an effect only in the material composite of the composite component, while the reinforcing element per se does not necessarily have to have high mechanical stability.

In the case of a method according to the present disclosure for the additive manufacturing of a composite component, a fluid matrix material by way of an additive manufacture is introduced successively into a manufacturing device with the formation of an additively manufactured component. In the process, a reinforcing element is at least partially introduced into the matrix material and/or arranged on the matrix material.

As already mentioned above, an additive manufacture can be understood to mean a production method in which components are generated or modified by successive (additive) application or deposition of material. In the case of the present disclosure, the material mentioned is a fluid matrix material. In this respect, the additive manufacture can be carried out by a 3D printer for example, generally referred to herein as a manufacturing device. In the process according to the present disclosure, fluid material (here: matrix material) is provided layer by layer, said fluid material firstly being deposited onto a carrier surface of the manufacturing device and then being deposited onto the already-applied (and optionally at least partially hardened or solidified) material. Provided as a fluid matrix material in particular is a thermoplastic material, such as for example PLA (Polylactic Acid), PET (Polyethylene Terephthalate), or ABS (Acrylonitrile Butadiene Styrene). However, other fluid materials such as metals or materials which are otherwise hardened (e.g., ceramics) can also be used. The material may undergo a chemical hardening (this is understood to mean, in particular, a polymerization which can be initiated thermally or in a radiation-based manner), but at the same time also a physical or thermal hardening. Here, in the manufacturing process that is in progress, the reinforcing element may be introduced, e.g. inserted, into the matrix material at suitable locations. Further matrix material is then added, with the result that the reinforcing element is embedded into the matrix material and surrounded thereby. The reinforcing element can be introduced into the matrix material in such a way that it is only partially surrounded by the matrix material, that is to say the reinforcing element protrudes partially out of the matrix material or is arranged on a surface of the matrix material. In order to provide a particularly high mechanical stability of a composite component manufactured in this way, it can be advantageous to embed the reinforcing element completely into the matrix material. In this way, the reinforcing elements can considerably improve the mechanical properties of the composite component, as is known in general for example in the case of fiber-reinforced composite components. As an alternative or in addition, it may be provided to arrange the reinforcing element on the (at least partially hardened) matrix material. A component produced in this way can thus comprise reinforcing elements introduced (or embedded) into the matrix material (at least partially) and/or arranged on the matrix material (i.e., a component surface). In the context of the present disclosure, an "arrangement" is understood here to mean in particular an arrangement on a component surface of the composite component.

According to a first variation of a method proposed by the present disclosure, it may be provided that a fiber tape is used as a reinforcing element. The fiber tape may, for example, be a flat fiber tape. Such tapes may be provided on rollers, unrolled therefrom, and deposited at suitable locations on the composite component to be additively manufactured. Fiber tapes can thus be wound. Such a fiber tape can be easily stored, transported, and processed. The expression "fiber tape" is to be understood to the effect that the tape has a low material thickness in comparison with its longitudinal extent. A "tape" also generally has a greater length than it does width. The fiber tape comprises (in addition to yet other possible constituent parts) fibers, in particular reinforcing fibers. According to the method of the present disclosure, it may be provided that not only are webs of the reinforcing element (e.g., fiber tapes) provided along individual partial regions of the composite component to be manufactured, but an application of the reinforcing element over the entire surface area of a surface of the composite component to be manufactured (i.e., of the matrix material already introduced into the manufacturing device) is performed. Correspondingly, it is possible for reinforcing elements to extend over the entire cross section of the composite component in a composite component manufactured according to the method of the present disclosure. In such a case, it may be advantageous to use fabrics instead of fiber tapes.

According to a further variation of a method according to the present disclosure, it may be provided that the fiber tape comprises unidirectionally aligned endless fibers which are embedded in a plastic matrix, in particular a thermoplastic material. The plastic may also be a synthetic resin, for example a polyester resin or an epoxy resin. Unidirectionally aligned endless fibers have the advantage that the mechanical properties of the fiber tape in particular in the longitudinal direction of the fiber tape are thus considerably improved. What is meant by improved mechanical properties can at this juncture be the mechanical stability of the fiber tape, in particular the tensile strength, shear strength, impact toughness, etc. Ultimately, an improvement in the mechanical properties of the fiber tape can also bring about a targeted reinforcement of the composite component to be manufactured. The embedding of fibers in the plastic matrix can lead to simplification of the ease of handling of the fiber tape and thus in terms of the positioning of the reinforcing element. The plastic matrix of the fiber tape (in which the fibers are embedded) may be a similar or different material in comparison to the matrix material introduced according to the present disclosure into the manufacturing device during the additive production.

According to another variation of a method according to the present disclosure, it may be provided that endless fibers in the form of natural fibers and/or mineral fibers and/or plastic fibers are used. Natural fibers have good mechanical properties, are cost-effective, and are biologically harmless. The use of such natural fibers increases the sustainability of the composite component manufactured by a method according to the present disclosure and facilitates disposal or recycling thereof. Typical natural fibers may be, for example, cotton fibers, flax fibers, hemp fibers, jute fibers, kenaf fibers, ramie fibers, sisal fibers, or wood fibers. Fibers obtained from biopolymers can also be referred to as natural fibers in a broader sense and can be used in the method according to the present disclosure. Mineral fibers have very good mechanical properties, but are frequently more difficult to process. Carbon fibers or aramid fibers have good mechanical strength and can be readily processed. The use of combinations of the materials mentioned may be expedient when specific demands are placed on the mechanical properties of the composite component. A combination of carbon fibers and aramid fibers leads, for example, to a high strength as a result of the carbon fibers and to a high impact toughness as a result of the aramid fibers.

According to yet a further variation of a method according to the present disclosure, it may be provided that the reinforcing element is completely surrounded by the fluid matrix material. This can lead to the composite part undergoing a uniform reinforcement and not just a reinforcement in certain regions. Depending on the use of the composite component, a uniform reinforcement—for example over the entire component cross section or longitudinal section—may be advantageous.

According to yet another variation of a method according to the present disclosure, it may be provided that the fluid matrix material is introduced into the manufacturing device by means of a deposition unit which is movably guided, in particular movably guided in three-dimensional space. "Introduction into the manufacturing device" can be understood to mean that the matrix material is first applied to a carrier surface of the manufacturing device (the carrier surface is not part of the manufactured composite component) or to a substrate arranged in the manufacturing device (this may be a constituent part of the composite component). What may also be meant by this is the application to already-introduced (and possibly already partially or completely hardened) matrix material.

The deposition unit can comprise a functional portion through which the matrix material is fed, for example as a thread-like filament, and a functional portion in which it is melted. Further feeding of matrix material results in a pressure in the melting region which is reduced in that the matrix material is discharged from the deposition unit through a nozzle.

The emerging matrix material is then introduced into the manufacturing device and can be stacked there. The deposition unit can be moved and positioned by one or more motor-operated linear spindles. The linear spindles may be integrated in the manufacturing device. A movement of the deposition unit in one or more of the three spatial directions x, y, and z can be performed by the linear spindles. It is also possible to combine the linear spindle(s) with a rotary guide, with the result that the deposition unit can be flexibly moved and positioned in three-dimensional space. The same thing can be performed by a robot, on which the deposition unit can be arranged, in particular on a robot arm. Such a robot arm can have multiple members, for example. The use of a delta robot is also suitable. However, the deposition unit does not necessarily have to be moved in three-dimensional space. The point is rather that a relative movement between component and deposition unit is made possible. It is thus, for example, not unconventional to realize the relative movements between deposition unit and composite component along one, more, or all directions of movement by moving the composite component or an associated manufacturing device (the deposition unit may be arranged in a stationary manner in this case). The deposition unit also does not have to be located inside the manufacturing device, as long as it can be positioned in the manufacturing device, for example by a robot arm. Correspondingly, it may be provided that one and the same deposition unit is used in a plurality of manufacturing devices, one and the same robot arm performing the positioning. The same thing can also be performed by way of any other units for moving and positioning the deposition unit.

According to still a further variation of a method according to the present disclosure, it may be provided that the reinforcing element is introduced into the matrix material and/or arranged on the matrix material by means of a laying unit which is movable, in particular movable in three-dimensional space. It is also desired here for a relative movement to be provided between the composite component to be manufactured (which is arranged in the manufacturing device) and the laying unit. The laying unit can be positioned and moved here in the same way as for the deposition unit, for example by linear spindles or a robot arm. Said robot arm can also feed reinforcing elements to a plurality of manufacturing devices. In one form, the laying unit is a tape laying unit for positioning and depositing fiber tapes. The laying unit may be connected to a pre-laying unit, on which the fiber tape is rolled up or provided (stored).

According to still another variation of a method according to the present disclosure, it may be provided that the deposition unit and the laying unit can be moved by a common moving unit. As a result, for example, costs can be reduced. Such an integrated arrangement also provides advantages in terms of control technology, since both units can be controlled in a simple manner via one and the same control unit or software executed thereon. Such a device can also provide a reproducible positioning (of the deposition unit and laying unit) relative to the composite component, since the two positions of deposition unit and laying unit are based on the same coordinate system and can be detected by the same measuring devices for the purpose of checking the position. In this respect, one specific configuration can be such that both units are installed at the end of a robot arm which has multiple members and positions the units at the corresponding locations on the composite component to be manufactured. Here, in that case, either matrix material or reinforcing elements can be disposed in succession or in parallel.

According to another variation of a method according to the present disclosure, it may be provided that the deposition unit and the laying unit can be moved via separate moving units. It may be advantageous for the laying unit and the deposition unit to be able to be positioned and moved independently of one another, as a result of which both units can be used in parallel at various locations on a composite component to be manufactured or in different manufacturing devices.

According to an additional variation of a method according to the present disclosure, it may be provided that the deposition unit and/or the laying unit feed the fluid matrix material or reinforcing elements to a plurality of manufacturing devices. If the laying unit can be positioned and moved independently of the deposition unit, it may be expedient for the laying unit to supply reinforcing elements to a plurality of manufacturing devices or deposit the reinforcing elements there. The same applies analogously for the deposition unit. When providing a plurality of manufacturing devices to be supplied by one deposition unit and/or laying unit (this can also apply to an integrated deposition and laying unit), the deposition unit and/or the laying unit have to be guided to the effect that they can reach all of the manufacturing devices.

It is readily also possible to provide a plurality of deposition units and/or laying units in one processing station, in order to increase the manufacturing speed of composite components (in particular in the case of simultaneous manufacture of a plurality of composite components in a plurality of manufacturing devices of a processing station). A processing station may be part of a manufacturing line for motor vehicles.

As mentioned above, a composite component is produced by a method according to the present disclosure and comprises a matrix material and a reinforcing element at least partially introduced therein and/or arranged thereon.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 illustrates a manufacturing device for producing a (fiber-reinforced) composite component with a laying unit and deposition unit arranged inside a manufacturing device according to one variation of the present disclosure;

FIG. 2 illustrates a manufacturing unit for producing a (fiber-reinforced) composite component with a laying unit arranged outside the manufacturing device according to another variation of the present disclosure; and FIG. 3 illustrates a processing station for producing a (fiber-reinforced) composite component, the laying unit supplying a plurality of manufacturing devices according to a further variation of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The figures show manufacturing devices which are suitable for carrying out the individual method steps and producing fiber composite components of matrix material and reinforcing elements, the mechanical properties of which are improved over components of pure matrix material.

Referring to FIG. 1, a manufacturing device 4 includes a deposition unit 6 and a laying unit 7, both of which are mounted on a common moving unit 8. The moving unit 8 makes it possible to move the deposition unit 6 and the laying unit 7 vertically and horizontally (as indicated by the arrows). The arrangement illustrated is suitable for additively manufacturing a fiber composite component 1. In the process, matrix material 2 from the deposition unit 6 is introduced into the manufacturing device 4 and a corresponding component shape is provided by moving the deposition unit 6 and injecting the matrix material 2. Reinforcing elements 5 are deposited on the matrix material 2 from the laying unit 7. A component 3 manufactured in this way comprises matrix material 2 and reinforcing elements 5 embedded into the matrix material 2 or deposited thereon. The component 3 may be referred to as a fiber composite component 1.

Referring now to FIG. 2, a manufacturing unit 4 includes a deposition unit 6 and a separate moving unit 8a for the deposition unit 6. Here, the laying unit 7 is likewise moved and positioned by a separate moving unit 8b. The component 3 manufactured in this way comprises matrix material 2 and reinforcing elements 5. The use of separate moving units 8a, 8b makes it possible for the structure to be able to introduce matrix material 2 and reinforcing elements 5 into the manufacturing device 4 at the same time. The laying unit 7 may also be used at a plurality of manufacturing devices 4 in such a configuration.

Referring now to FIG. 3, a structure of a processing station includes of a plurality of manufacturing devices 4a, 4b, which are supplied with reinforcing elements 5 by one and the same laying unit 7. The moving unit 8b is independent of the moving units 8a, which are not shown, of the deposition unit 6, which is likewise not shown. In this respect, the moving unit 8b of the laying unit 7 is arranged and formed in such a way that the laying unit 7 can reach both manufacturing devices 4a, 4b.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for additive manufacturing of a composite component, in which a fluid matrix material by way of an additive manufacture is introduced successively into a manufacturing device by a deposition process to form an additively manufactured component, wherein a reinforcing element is introduced into the fluid matrix material by a laying process, the laying process being separate from the deposition process, wherein the reinforcement element is embedded into and at least partially surrounded by the fluid matrix material, and wherein the deposition process and the laying process are configured to be carried out in parallel at different locations on the composite component.

2. The method according to claim 1, wherein a fiber tape is used as the reinforcing element.

3. The method according to claim 2, wherein the fiber tape comprises unidirectionally aligned endless fibers embedded in a plastic matrix.

4. The method according to claim 3, wherein the unidirectionally aligned endless fibers are natural fibers.

5. The method according to claim 3, wherein the unidirectionally aligned endless fibers are mineral fibers.

6. The method according to claim 3, wherein the unidirectionally aligned endless fibers are plastic fibers.

7. The method according to claim 1, wherein the reinforcing element is surrounded completely by the fluid matrix material.

8. The method according to claim 1, wherein the fluid matrix material is introduced into the manufacturing device by a deposition unit which is movably guided in three-dimensional space.

9. The method according to claim 1, wherein the reinforcing element is introduced into the fluid matrix material by a laying unit which is movable in three-dimensional space.

10. The method according to claim 9, wherein the fluid matrix material is introduced into the manufacturing device by a deposition unit which is movably guided in three-dimensional space, and wherein the deposition unit and the laying unit are configured to be moved by a common moving unit.

11. The method according to claim 9, wherein the fluid matrix material is introduced into the manufacturing device by a deposition unit which is movably guided in three-dimensional space, and wherein the deposition unit and the laying unit are configured to be moved via separate moving units.

12. The method according to claim 1, wherein a deposition unit and/or a laying unit supplies the fluid matrix material or reinforcing element to a plurality of manufacturing devices.

13. A method for additive manufacturing of a composite component, in which a fluid matrix material by way of an additive manufacture is introduced successively into a manufacturing device by a deposition process to form an additively manufactured component, wherein a reinforcing element is introduced into the fluid matrix material by a laying process, the laying process being separate from the deposition process, wherein the reinforcement element is embedded into and at least partially surrounded by the fluid matrix material, and wherein the deposition process and the laying process are configured to be carried out in parallel at different locations on the composite component, and wherein a fiber tape is used as the reinforcing element.

14. The method according to claim 13, wherein the fiber tape comprises unidirectionally aligned endless fibers which are embedded in a plastic matrix.

15. The method according to claim 14, wherein the plastic matrix is one of a thermoplastic material and a synthetic resin.

16. The method according to claim 13, wherein the reinforcing element is surrounded completely by the fluid matrix material.

\* \* \* \* \*